United States Patent [19]

Kimura et al.

[11] 4,314,357
[45] Feb. 2, 1982

[54] FORM COMBINING AND RECORDING DEVICE

[75] Inventors: Tsutomu Kimura; Hitoshi Miyoshi, both of Asaka, Japan

[73] Assignee: Fuji Photo Film Co., Ltd., Minami-ashigara, Japan

[21] Appl. No.: 105,332

[22] Filed: Dec. 19, 1979

[30] Foreign Application Priority Data

Dec. 27, 1978 [JP] Japan .................... 53-161920

[51] Int. Cl.³ .................................... G06F 3/14
[52] U.S. Cl. ........................ 364/900; 340/750; 340/799
[58] Field of Search ................... 340/798–802, 340/790, 750, 735, 721, ; 346/108; 354/6, 7, 11, 13; 364/900 MS file, 200 MS File; 178/30

[56] References Cited

U.S. PATENT DOCUMENTS

| 3,868,675 | 2/1975 | Firmin | 340/802 |
| 4,041,482 | 8/1977 | Freudeberg et al. | 340/798 |
| 4,115,765 | 9/1978 | Hartke | 340/802 |
| 4,121,283 | 10/1978 | Walker | 340/750 |
| 4,125,829 | 11/1978 | Kayashima | 340/800 |

*Primary Examiner*—Leo H. Boudreau
*Attorney, Agent, or Firm*—Sughrue, Mion, Zinn, Macpeak and Seas

[57] ABSTRACT

A form combining and recording device wherein form data and print data are combined in a single frame memory. A separate frame designation memory is provided for determining whether the contents of a particular location in the frame memory are print or form data. Form data is given priority for the read-in operation. For the recording of information from the frame memory, characters are written with one character font type for print data and a different font type for form data so that the two may be readily distinguished.

5 Claims, 6 Drawing Figures

| 1 | 1 | 1 | 1 | 0 | 0 |
|---|---|---|---|---|---|
| F | O | R | M | 9 | 9 |
| 0 | 0 | 0 | 0 | 0 | 0 |
| 1 | 2 | 3 | 4 | 5 | 6 |
| 0 | 1 | 0 | 0 | 1 | 0 |
| 7 | ■ | 1 | 2 | ■ | 8 |

FORM COMBINING AND RECORDING DEVICE

BACKGROUND OF THE INVENTION

The present invention relates to a form combining and recording device in which data to be printed (variable information) stored on a magnetic tape or the like is read out and electronically combined with form data (fixed information), which has also been stored, with the data thus combined recorded upon a recording material.

A computer output microfilmer (hereinafter referred to merely as "a COM") in which data to be printed (print data) stored in a memory device such as a magnetic tape is read out and combined with form data and the data thus combined is recorded on a recording material such as a photographic film. In a conventional COM, form data recorded on a photographic film called a "form slide" is projected onto a recording material by an optical system so as to be recorded thereon. The print data is correctly positioned with respect to the form data projected onto the recording material and the two are projected by the optical system onto the recording material so as to be recorded. If in this connection a variety of forms are necessary (or in "a multiform job"), it is necessary to provide a form slide replacing device for replacing the form slide. As it is required that this device be able to position the print data and form data with a high accuracy and that it be compact, the COM is usually intricate in construction and high in manufacturing cost.

In general, the replacement of the form slide takes from several seconds to several tens of seconds thereby decreasing the processing speed of the COM. Furthermore a COM is known in the art in which a laser beam is scanned to record in a heat mode print data on a recording material low in sensitivity. However, with this COM, it is impossible to record form data on the recording material because of its low sensitivity even if the form slide is projected onto the recording material.

In order to eliminate the above-described difficulties, form combining and recording devices according to the several different systems in which form data is electronically provided similar to the case of print data were developed. In the first such system, a frame memory is provided which treats the entire form as one dot pattern and stores as a dot pattern the form data for one picture. A format is generated in synchronization with the print data, the format being combined with the dot information of the print data by means of an OR circuit. In this case, it is necessary to form an input dot pattern form representative of the entire form. Production of such an input is quite complex. Furthermore, the capacity of the frame memory in the recording device is quite large and the capacity of the recording medium which stores form data in dot pattern form for the multiform job is also very large.

A second such system includes a frame memory which can be used for both the print data and the form data and a character generating circuit. The print data and the form data are arranged by the main memory in a computer and the data thus arranged is transferred to the frame memory so as to be recorded. In this case, the amount of hardware is reduced. However, it is necessary to arrange print data and form data whenever the recording of each picture so that the processing time is very long with this system. Especially in the case where the processing is carried out with a computer as an intelligent recording device incorporated in the recording device, the total recording speed of the recording device is decreased and therefore the performance of the device is lowered. In addition, as the print data and the form data are characters generated by the same character generating circuit, the form data and the print data which are recorded cannot be distinguished from each other merely by referring to the type of characters employed.

In a third system, a frame memory and a character generating circuit are provided for each of the print data and the form data. These elements are operated in synchronization with one another. The dot information of print data and the dot information of form data which are produced by the respective character generating circuits are combined in an OR circuit. The system is advantageous in that the form data can be easily produced and it is unnecessary for the ordinary recording processing to take into account the combination of forms after the form data has been written into a form data frame memory. That is, if after the form data have been written into the form data frame memory print data loaded from the magnetic tape is simply written into a print data frame memory to carry out the recording, then combining and recording the form data and the print data can be effected by the hardware.

In the third system, the capacities of the form data frame memory and of the recording medium are smaller than those in the first system. However, the amount of hardware needed is large because it is necessary to provide two frame memories, namely a print data frame memory and a form data frame memory.

An object of the invention is thus to provide a form combining and recording device in which all of the above-described difficulties accompanying a conventional form combining and recording device have been eliminated. More specifically, an object of the invention is to provide a form combining and recording device in which the amount of hardware is reduced, form data can be readily produced, the ordinary recording processing time is maintained short, and recorded form data and print data can be distinguished from each other merely by referring to the types of characters used.

SUMMARY OF THE INVENTION

Provided by the invention is a form combining and recording device which, according to the invention, includes a frame memory for storing print data and form data, a form designation memory for storing data designating whether the contents of the frame memory are form data or print data, a writing control circuit which combines the form data and print data by inhibiting the writing of the print data into positions in the frame memory which the contents of the form designation memory indicate contain form data and by writing the form data into positions in the frame memory which are indicated by the contents of the form designation memory as not containing form data and permits the frame memory to store the form data thus combined, a character generating circuit for reading data out of the frame memory to generate character patterns, and a recording section for storing characters or the like with the aid of an output of the character generating circuit. In this device, when recording is started and a different form is to be used, it is necessary before writing print data into the frame memory that predetermined form data be written into predetermined positions and that information representative of form data be written into positions in the form designation memory which corresponds to the positions in the frame memory into which the frame data has been written.

In one preferred embodiment of the invention, the character generating circuit includes two kinds of font memories which contain different character types for the same character code. One of the character font memories is selected according to the contents of the form designation memory whereby the form data and the print data are recorded with characters of different type formats.

In another preferred embodiment of the invention, the character generating circuit includes a character type changing circuit which is operated only when the contents of the form designation memory are form data whereby the print data and the form data are recorded with characters of different type format.

DESCRIPTION OF THE PREFERRED EMBODIMENTS

Figure 1:
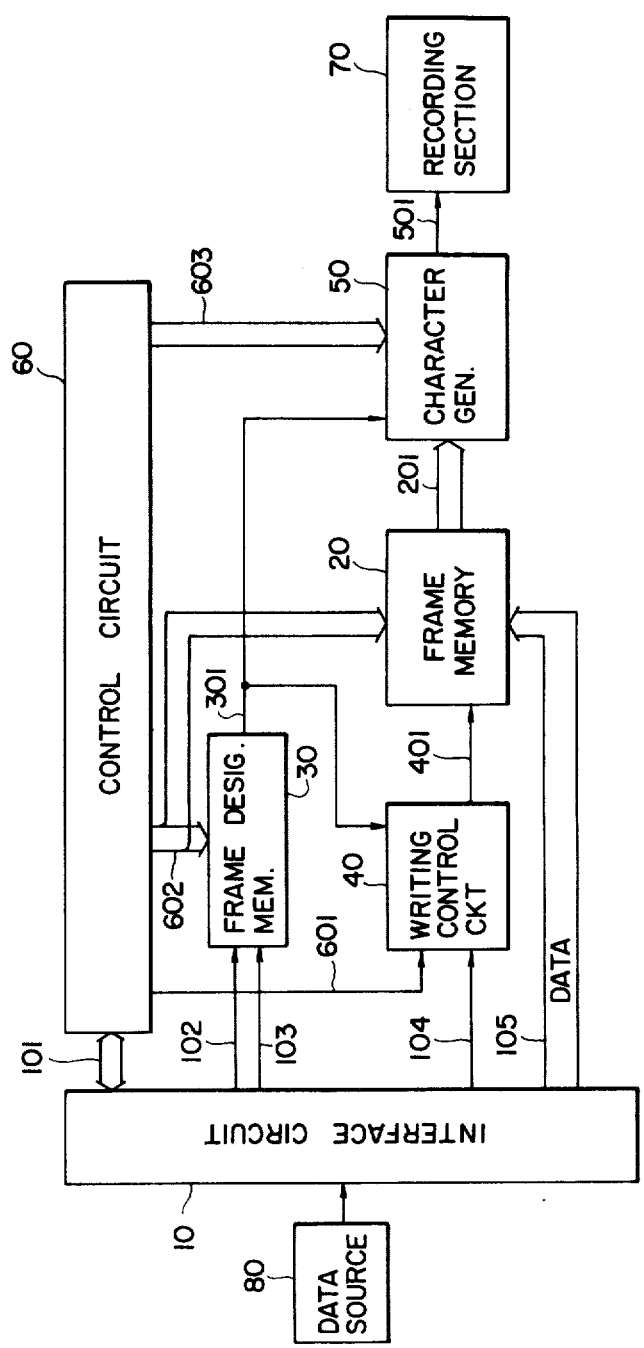
FIG. 1 is a block diagram showing an example of a form combining and recording device according to the invention.

A form combining and recording device of the invention utilizing a raster scan system will be described with reference to the accompanying drawings. FIG. 1 is a block diagram showing this device. The device includes an interface circuit for receiving data to the recorded from an external device such as a computer or a magnetic tape device and for data to be recorded from an external device, a frame memory for storing data to be recorded which corresponds to one picture, a form designation memory 30 for storing data designating whether the data stored in the frame memory 20 is print data or form data, a writing control circuit 40 for controlling a data write pulse 401 to the frame memory 20 according to a form designation signal 301 applied by the form designation memory 30, a character generating circuit 50 which receives a character signal 201 from the frame memory 20 and produces in response thereto a character dot signal 501, a control device 60 for controlling the entire recording device, and a recording section 70 which receives the character dot signal 501 in response to which it records a character pattern on a recording material. The recording section 70 may include, for instance, a laser beam which is subjected to on-off modulation while the recording material is being scanned with the laser beam thereby to record information on the recording material. Reference numeral 101 designates various signals between the interface circuit 10 and the control circuit 60, 102 a form data signal, and 103 a form write pulse.

Figures 2, 3:
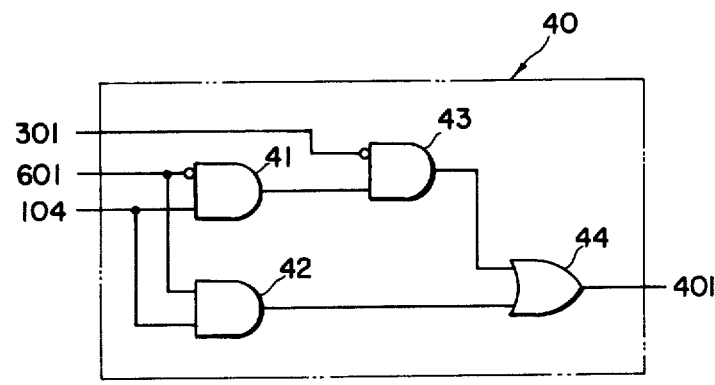
FIG. 2 is a diagram used for a description of the relation between a frame memory and a form designation memory.
FIG. 3 is a block diagram showing details of the writing control circuit of FIG. 1.

A recorded picture, which is the combination of print data and form data, the frame memory and the form designation memory in this connection will be described. FIG. 2 shows examples of the contents of the frame memory 20, the larger characters or figures, and the contents of the form designation memory 30, the smaller digits "1" or "0."

In FIG. 2, among the contents of the frame memory, "FORM," and "□" are form data for which the corresponding content of the form designation memory 30 for them is the small digit "1." The large figures "9," "9" "1," "2" . . . are print data in the frame memory for which the corresponding content of the form designation memory 30 is the small digit "0." That is, with respect to the positions as defined by the lines and columns of data for one picture to be recorded, the form data and print data are stored in the frame memory 20 and a corresponding "1" or "0" is stored in the form designation memory 30 for each of the positions of the data according to the type of the data.

Next, the writing control circuit 40 will be described of which FIG. 3 shows a preferred example. The writing control circuit 40 controls the writing of a data signal 105 into the frame memory 20 according to the states of form writing designation signals 601 from the control circuit 60 and the states of form designation data from the form designation memory 30. That is, the writing control circuit 40 is operated either in a form writing mode or in a print writing mode. In the case where form data is to be written into the frame memory, the form writing designation signal 601 is at the logic level "1." In this case, the write pulse 104 passes through a gate 41 and passes through an AND gate 42 and an OR gate 44 irrespective of the logic level of the form designation data 301 thereby to become the write pulse 401. As a result, a data signal 105 is written into the frame memory 20 as indicated by the data write pulse 401.

On the other hand, in the case where print data is to be written into the frame memory 20, the form writing designation signal 601 is at the logic level "0" and the write pulse 104 is applied through the gate 41 to the gate 43. If the form designation data 301 is at "0," the write pulse 104 passes through the gate 43 and through the OR gate 44 becoming the gate write pulse 401. As a result, the data signal 105 is written into the frame memory 20. However, if the form designation signal 301 is at "1," the gate 43 is closed and no data write pulse 401 from the writing control circuit 40 is produced. Accordingly, the form data which has been stored in the frame memory 20 remains unchanged. Thus, for every picture, either form data is written in the frame memory 20 or the print data only is rewritten while the form data maintains unchanged.

Figure 4:
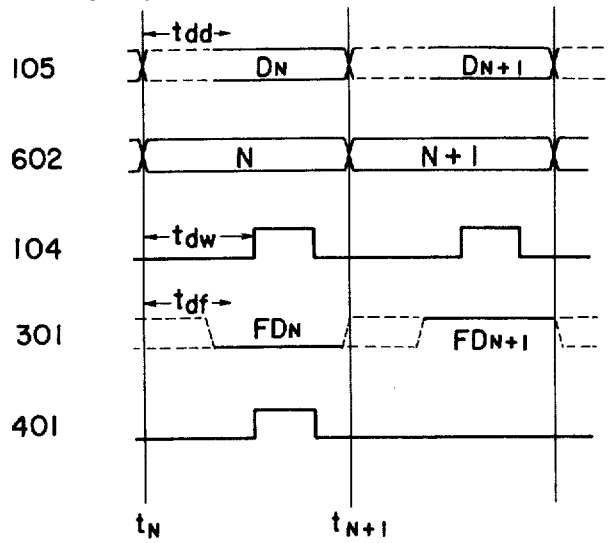
FIG. 4 is a timing chart used for a description of signals in the writing control circuit.

The timing of the aforementioned signals in the print data writing mode will be described with reference to FIG. 4. In FIG. 4, the horizontal axis indicates lapsed time from left to right while the vertical axis indicates the logic states of the various signals. More specifically, FIG. 4 illustrates the signal states for writing data into the frame memory 20 when the N-th signal $D_N$ and the N+1-th signal $D_{N+1}$ are coupled through the interface circuit from the external device 80. The data signal 105 ($D_N$) which is transferred through the interface circuit 10 at the time instant $t_N$ has settled to a stable state within a period of time $t_{dd}$. In this case, the control circuit 60 applies an address signal 602 to the frame memory 20 and the form designation memory 30. The output of the form designation memory 30 extracted from an address specified as the N-th address position by the address signal 602 becomes a stable form designation data signal 301 (FD$_N$) within a period of time t$_{df}$. The write pulse 104 is then received from the interface circuit 10 after a period of time t$_{dw}$ which is longer than t$_{dd}$ and t$_{df}$ after the time instant t$_N$. The write pulse 104 is applied as the data write pulse 401 to the frame memory 20 from the writing control circuit 40 because the form designation data 301 (FD$_N$) is at "0." Thus, the data signal 105 (D$_N$) is written at the address N in the frame memory 20. Similarly, the operation of writing the N+1-th signal is started at the time instant t$_{N+1}$. In this case, as the form designation data 301 (FD$_{N+1}$) is at "1," no data write pulse 401 is received. Accordingly, the data signal 105 (D$_{N+1}$) is disregarded and the form data which was previously written in the frame memory 20 remains unchanged.

The operation of the complete device according to the invention will now be described with reference again to FIG. 1. First, form data is written into the frame memory 20 through the interface circuit 10 from the external device 80. In this operation, the control circuit 60 sets the writing control circuit 40 in the form writing mode with the aid of the form writing signal 601, so that the data signal 105 is written as form data into the frame memory 20. In response to this operation, a "1" is written into the position in the frame designation memory 30 which corresponds to the positions in the frame memory 20 where the form data have been written as described above and a "0" is written into the remaining positions. Thus, presetting of the form data has been achieved.

When the writing control circuit 40 is set to the print data writing mode then the print data for one picture which is transferred into the system from the external device is written into the positions other than the aforementioned positions into which the form data has been written. As a result, the contents of the frame memory 20 is a combination of form and print data. The content of the frame memory 20 assembled through this combination is applied through the character generating circuit 50 to the recording section 70 where it is recorded as combined visible information. In the case of multiform usage, whenever the form is to be changed, presetting of form data is electronically carried out before the change as a result of which the processing speed is high.

Figure 5:
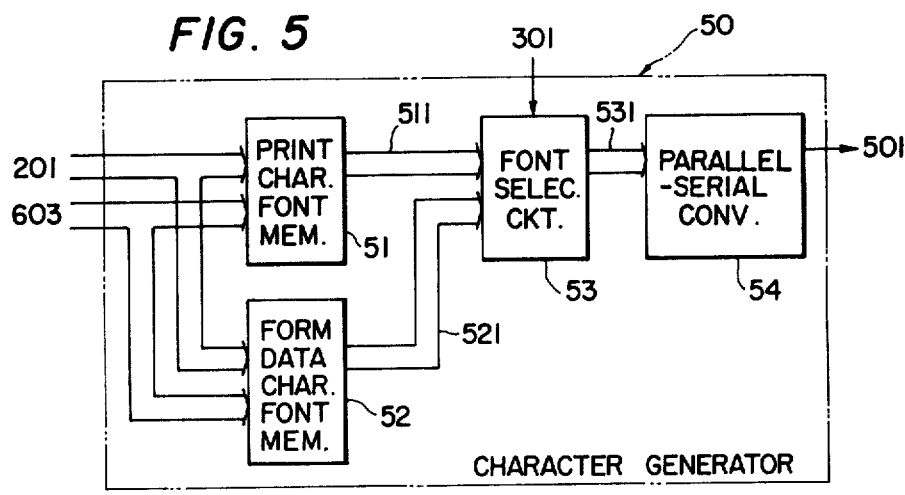
FIG. 5 and FIG. 6 are block diagrams showing examples of character generating circuits which may be employed with preferred embodiments of the invention.

FIG. 5 is a diagram for a description of one embodiment of the character generating circuit 50 as used with the invention. The character generating circuit as shown in FIG. 5 includes a print data character font memory 51, a form data character font memory 52 which stores a character font different from the character font of the memory 51, a selection circuit 53 for selecting one of the two character font memories, and a parallel-serial conversion circuit 54 which converts character font data 531, which is in the form of parallel data, into a serial character dot signal 501 in a time series mode. Reference numeral 603 designates a signal which designates a scanning line number. The selection circuit 53 selects a print data character font 511 when the form designation data 301 is at "0." When the form designation data 301 is at "1," the selection circuit 53 selects a form data character font 521 to thereby output character font data 531. As is evident from the discussion above, the operation of the form designation memory 30 is synchronous with the operation of the frame memory 20. Therefore, in the case where the character code signal from the frame memory 20 is indicated as print data, the character dot signal 501 corresponds to the character font of the print data character font memory. In the case where the character code signal is a form data, the character dot signal 501 corresponds to the character font of the form data character font memory. Thus, characters of different configuration can be recorded by using the form data and the print data.

Figure 6:
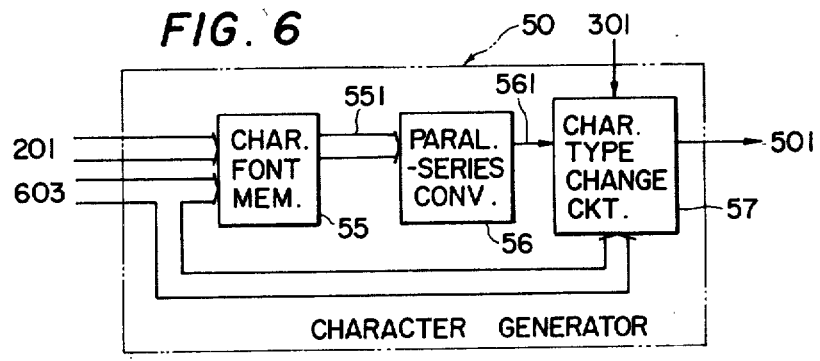

Another example of the character generating circuit 50 is shown in FIG. 6 which includes a character font memory 55, a parallel-serial conversion circuit 56, and a character type changing circuit 57. As example of the circuit 57 is described in Japanese Laid-Open Patent Application No. 36031/1976. In the circuit 57, a character dot signal 561 produced by the parallel-serial conversion circuit 56 is used without modification as a character dot signal 501 when the form designation data 301 is at "0" so that a character dot signal of the ordinary character font is produced. When the for designation data 301 is at "1," the character dot signal 561 is modified before being used to a character font different from the aforementioned ordinary character font. Thus, the form data and the print data can be recorded with characters of different type fonts.

As is apparent from the above-description, in the form combining and recording device of the invention, the amount of hardware is small, the forms can be quickly combined and changed, and the form data can be distinguished from the print data merely by referring to the type font of the characters.

What is claimed is:

1. A form combining and recording device comprising: a frame memory for storing print data and form data; a form designation memory for storing data for determining whether contents stored in said frame memory are form data or print data; a writing control circuit for combining said form data and print data by inhibiting writing of said print data into positions in said frame memory indicated by contents of said form designation memory as being form data and by writing said form data into positions in said frame memory indicated by said contents of said form designation memory as not being form data; a character generating circuit for generating signals representing character patterns in response to data read out from said frame memory and a recording section for recording characters and pattern information in response to an output of said character generating circuit.

2. The form combining and recording device as claimed in claim 1 wherein said character generating circuit comprises first and second font memories of different character font types, said font memories producing the same character but of different font types in response to the same character code, one of said character font memories being selected according to the contents of said form designation memory whereby said form data and said print data are recorded with characters different of different font type.

3. The form combining and recording device of claim 2 wherein said character generating circuit further comprises a font selection circuit having first and second input ports, said first input port being coupled to receive inputs from said first font memory and said second input port being coupled to receive outputs from said second font memory, said font selection circuit operating in response to an output of said frame designation memory and a parallel-serial converter coupled to an output port of said font selection circuit.

4. The form combining and recording device as claimed in claim 1 wherein said character generating circuit comprises a character font type changing circuit which is activated only when a selected contents of said form designation memory are form data whereby said print data and said form data are recorded with characters of different font type.

5. The form combining and recording device of claim 5 4 further comprising a parallel-serial converter having an input port coupled to receive outputs from said font memory and an output line coupled to an input of said character type changing circuit.

* * * * *